US008977718B2

(12) United States Patent
Ronco et al.

(10) Patent No.: US 8,977,718 B2
(45) Date of Patent: Mar. 10, 2015

(54) WEBSITE REDEVELOPMENT WRAPPER

(75) Inventors: Justin Ronco, Redmond, WA (US); Eric Michael Pierce, Bellevue, WA (US); Vladimir P. Cabildo, Bellevue, WA (US); Nazar Abdelrahman, Redmond, WA (US); Anjalika Sarupria Mitra, Sammamish, WA (US); Priyanka Mittal, Redmond, WA (US); George N. Katselis, Redmond, WA (US); Kishore Kulkarni, Bothell, WA (US); Leanne Complin, Cary, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 408 days.

(21) Appl. No.: 12/916,937

(22) Filed: Nov. 1, 2010

(65) Prior Publication Data
US 2012/0110129 A1 May 3, 2012

(51) Int. Cl.
G06F 15/16 (2006.01)
H04L 29/08 (2006.01)

(52) U.S. Cl.
CPC ............ *H04L 67/2823* (2013.01); *H04L 67/02* (2013.01)
USPC ........... 709/219; 709/217; 709/223; 709/202; 709/203

(58) Field of Classification Search
CPC .............. H04L 12/1813; H04L 12/581; H04L 12/5855; H04L 29/06; H04L 29/12066
USPC .......................... 709/219, 217, 223, 202, 203
See application file for complete search history.

(56) References Cited

U.S. PATENT DOCUMENTS

| 2008/0005164 | A1  | 1/2008  | Yee et al. |         |
|--------------|-----|---------|------------|---------|
| 2008/0133693 | A1* | 6/2008  | Douglass et al. | 709/214 |
| 2009/0204688 | A1  | 8/2009  | Britton et al. |     |
| 2009/0313559 | A1  | 12/2009 | Kane       |         |
| 2010/0138485 | A1* | 6/2010  | Chow et al. | 709/203 |
| 2011/0320521 | A1* | 12/2011 | Steiner    | 709/203 |

FOREIGN PATENT DOCUMENTS

WO 2010025185 A1 3/2010

OTHER PUBLICATIONS

"Multiple Site Manager", Retrieved at << http://expressionengine.com/user_guide/cp/sites/index.html >>, Jul. 26, 2010, pp. 2.

* cited by examiner

*Primary Examiner* — Lan-Dai T Truong
(74) *Attorney, Agent, or Firm* — Bryan Webster; Kate Drakos; Micky Minhas

(57) ABSTRACT

Existing network-based services can be reused by a new network service providing an updated interface to the existing services. A client request directed to the new network service triggers a back-end request from the new network service to the existing network service. The back-end request comprises aspects of the client's request and additional formatting rules and other information to override specific aspects of the existing network service. The existing network service generates a back-end response with its existing functionality that is being reused, and applies the specified overrides. Additional information to be utilized by the new network service in responding to the client can be added to the back-end response. The new network service can then form and transmit a response to the client by utilizing the central portion of the back-end response and appending additional information to it, including the information specified by the existing network-service.

20 Claims, 5 Drawing Sheets

WEBSITE REDEVELOPMENT WRAPPER

BACKGROUND

As network communications among the multiple computing devices have become ubiquitous, a greater quantity of services have been made available via such network communications. For example, the growth of the Internet and the World Wide Web has caused websites and other content servers to transform from merely presenting informational content to now offering more complex and dynamic services, such as interactive services that can be based on substantial computation by one or more computing devices hosting such services.

Together with the greater computational burden shouldered by server computing devices that host such services, the programming to create and maintain such services has likewise increased. While a simple informational content presentation service can be created within a relatively short amount of time by even one inexperienced programmer, modern dynamic and interactive services can require teams of programmers years to develop and debug.

Unfortunately, while the investment in such complex network-based services can be substantial, it can also be subject to the ephemeral nature of a modern, network-centric business environment. For example, network-based services can be bought and sold among various corporations, since, at least in theory, such acquisitions can be performed more efficiently than the acquisitions of a more traditional, human resource-intensive, operation. However, while the core services that are being offered can remain the same, often the purchasing corporation wishes for such services to be presented in accordance with the look and feel commensurate with other network presences of such a corporation, or may wish that such services be presented within the context of existing network-based infrastructure already established by the purchasing corporation. Even if the network-based services remain owned by the same corporation, there may still arise business decisions that impact, not the core services themselves, but rather peripheral aspects of the presentation of such services to end-users. For example, the network-based services can be rebranded or bundled with a different collection of services. In either case, the look and feel, and, indeed, the peripheral operation of the network-based services may need to be changed, which can result in further substantial investment in recoding the services.

SUMMARY

In one embodiment, to facilitate the reuse of existing network-based services, a wrapper can be implemented, such that a new network service can provide a new front-end interface that can be presented to clients, but, for the core functionality, the new network service can reform the clients' requests into its own requests to an instance of the existing network-based service. The existing network service can then perform the core functionality, as before, except that when forming a response, the existing network service can form the response in accordance with instructions provided by the new network service as part of the reformed requests that the new network service had directed to the existing service. Upon receiving the response from the existing network service, the new network service can incorporate the response accordingly, and can then provide it to the client. In such a manner, a new network service can provide a new front-end interface without a substantial recoding of the processes executing on the existing network service.

In another embodiment, when reforming a client's request for transmission to the existing network service, the new network service can incorporate instructions specifying the format, and other aspects, of the response that is to be provided by the existing network service. Similarly, when forming the response, the existing network service can do so in accordance with these instructions.

In a further embodiment, when providing a response to the new network service, the existing network service can provide additional information to enable the new network service to properly format, and to otherwise properly present, it's response to a client.

In a still further embodiment, when implemented within the context of industry-standard protocols, the additional information exchanged within the requests and responses between the new network service and the existing network service can be incorporated into nonstandard headers, or other such extensions. Consequently, both the new network service and the existing network service can comprise peripheral processes that can understand such nonstandard extensions and can be executed in accordance with the information provided via such nonstandard extensions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
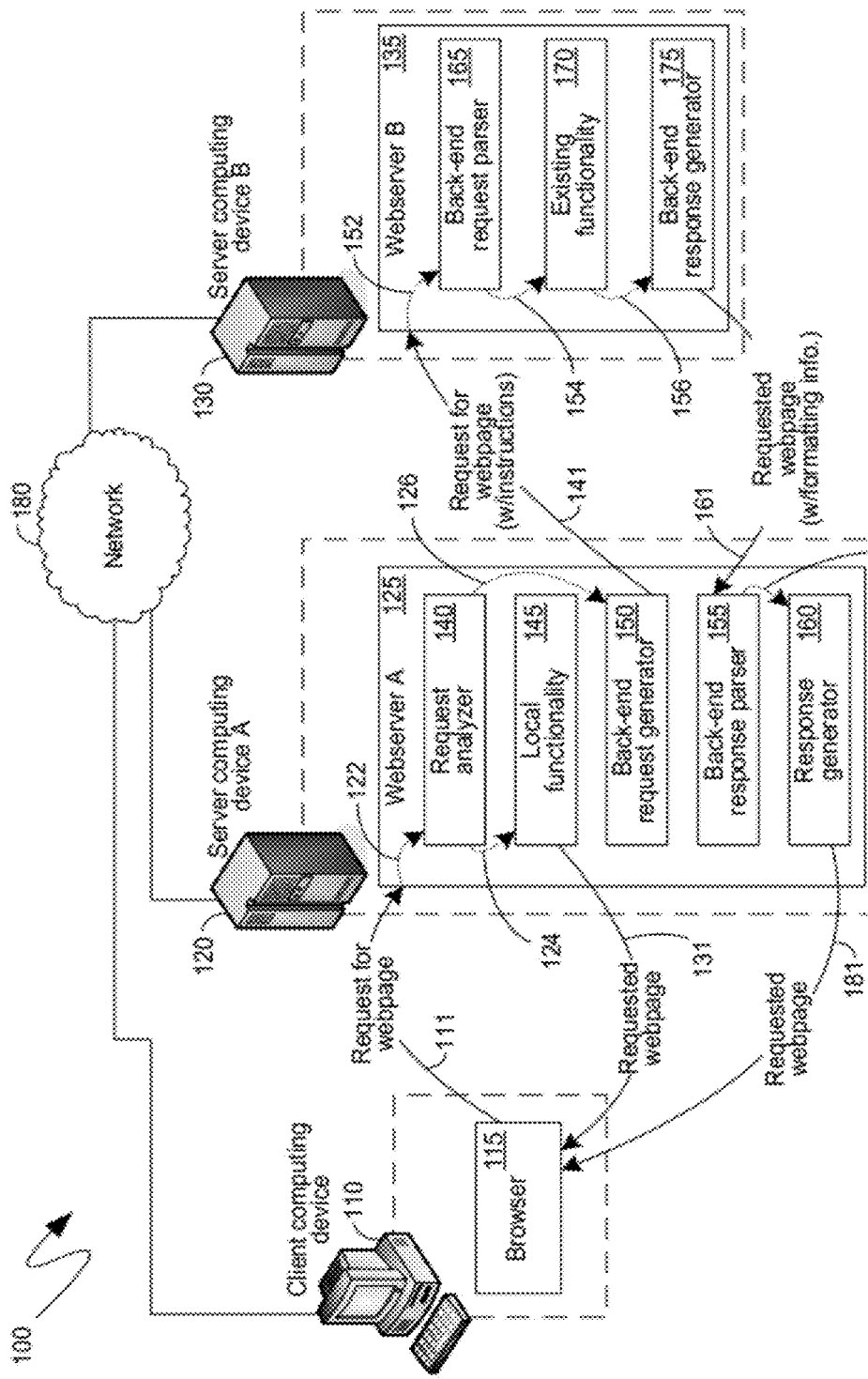
FIG. 1 is a block diagram of an exemplary network of computing devices.

The following description relates to the reuse of existing services provided over a network, thereby enabling a new interface to be implemented for such existing services without requiring substantial recoding of the processes performing such services. A new network service can be created to implement a new interface for existing network-based services that can continue to be provided by an existing network service. The existing network service can be modified to comprise peripheral processes that can parse and respond to specific instructions from the new network service that can be provided via nonstandard extensions. Similarly, the new service can comprise processes that can reform a client's request and send it along to the existing network service, together with specific instructions as to specified aspects of the response that is to be provided by the existing network service. The existing network service can then perform the existing services, and provide a response to the new service in accordance with the specific instructions that were provided as part of the reformed client's request. The new network service can then incorporate this response into its own response to the client, thereby providing the client with access to existing network services, except within the context of the new interface.

For purposes of illustration, the techniques described herein make reference to existing and known networking infrastructure, such as the ubiquitous Internet and World Wide Web (WWW). Also for purposes of illustration, the techniques described herein make reference to existing and known protocols and languages, such as the ubiquitous HyperText Transfer Protocol (HTTP) and the equally ubiquitous HyperText Markup Language (HTML). Such references, however, are strictly exemplary and are not intended to limit the mechanisms described to the specific examples provided. Indeed, the techniques described are applicable to any reuse of existing functionality within the context of requests and responses provided through network protocols.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary system 100 is shown, comprising a client computing device 110, two server computing devices, namely the server computing devices 120 and 130, and the network 180 enabling communications between two or more of the client computing device 110 and the server computing devices 120 and 130. Although illustrated as separate server computing devices 120 and 130, the mechanisms described herein are equally applicable to independent processes executing on a single server computing device. The mechanisms described herein are also applicable to virtualized server computing devices, such as can be created by one or more processes executing on either a single physical computing device or multiple physical computing devices. Server computing devices 120 and 130, therefore, are meant to represent not just physical server computing devices, but also virtualized server computing devices, or any other like independent executing processes. As will be described below, the system 100 of FIG. 1 further comprises a browser 115 executing on the client computing device 110 and web servers 125 and 135 executing on the server computing devices 120 and 130, respectively. Again, such nomenclature is utilized for descriptive clarity and to provide a common basis of understanding, and is not intended to limit the descriptions provided herein strictly to the WWW and web-centric environment illustrated and referenced.

For purposes of the descriptions below, the server computing device 130 can comprise a web server 135 that can comprise one or more components that can provide some functionality, or service, over the network 180 that can be desirable to retain, and that can be sufficiently complex that simply re-coding the computer executable instructions that provide such functionality or service can be unappealing. Strictly for purposes of illustration, a single component 170 is illustrated as providing such existing functionality, though, as will be known by those skilled in the art, such functionality can likely be provided by multiple, interoperable components. For example, the existing functionality 170 can provide a mail server, a forum, or other online social network, a translation service, or any other like functionality that can accept user input over the network 180 and can provide functionality, or services, to such a user via responses to that user's input.

In one embodiment, a server computing device 120 can be provisioned to execute a web server 125 that can provide a new interface to the existing functionality 170 of the web server 135 executing on the server computing device 130. For example, the web server 125, executing on the server computing device 120, can provide a rebranding of the existing functionality 170, either as part of an internal rebranding effort, or as part of a transfer of the existing functionality 172, for example, to a new owner. As will be recognized by those skilled in the art, interface changes, such as within the context of the WWW, can be notoriously difficult to implement, at least in part because such changes can affect the structure of the resource locators that can be utilized to identify various resources that are to be accessed by the browser 115.

Additionally, although not specifically illustrated by FIG. 1 to retain illustrative simplicity, the system 100 of FIG. 1 can comprise multiple server computing devices analogous to the server computing device 130 that provide multiple existing functionality, such as the existing functionality 170. In such an embodiment, the mechanisms described below can be repeated by the server computing device 120, and the processes executing thereon, to provide, for example, a new, single, amalgamated interface to the multiple existing functionality provided by the multiple server computing devices. For example, the server computing device 120 can provide a single interface by which a user of the client computing device 110 could be presented, through the browser 115, access to the multiple existing functionality simultaneously. In such an embodiment, the mechanisms described below can simply be repeated for each existing functionality and an amalgamated interface can be constructed in a manner well known to those skilled in the art.

Initially, the browser 115 executing on the client computing device 110 can make a request of the web server 125 executing on the server computing device 120, such as the request 111 shown in the system 100 of FIG. 1. The browser 115 can have been directed to the web server 125 executing on the server computing device 120, as opposed to the web server 135 executing on the server computing device 130, either by existing direction mechanisms, such as known search engines, or as part of a client's direct entry of the new resource identifier that identifies the web server 125, as opposed to the web server 135. However, in certain circumstances, a client may not be aware of a change, and may direct their browser 115 to the web server 135 executing on the server computing device 130. Although not specifically illustrated in the system 100 of FIG. 1, in order to maintain illustrative readability, in one embodiment, multiple instances of the web server 135 can be executed, including being executed side-by-side on a single server computing device, such as the server computing device 130. For example, one instance of the web server 135 can comprise only the existing functionality 170, and can behave in the same manner as it did previously. Such an instance can be utilized to continue to provide functionality and services to a client that, for example, may be utilizing an old bookmark, or other out of date addressing information. The other instance of the Web server 135 can comprise all of the components illustrated in the system 100 of FIG. 1 and can be utilized in the manner described in detail below.

Initially, upon receiving the request 111, the web server 125 can first provide such a request to a request analyzer 140. In one embodiment, the request analyzer 140 can determine whether the request 111 is a request for functionality that can be provided by the web server 125 without reference to the existing functionality 170 of the web server 135. If the request 111 is determined by the request analyzer 140 to be a request for some functionality of the web server 125, and does not require the existing functionality 170 of the web server 135, then the request analyzer 140 can provide such a request to the local functionality 145 of the web server 125. The local functionality 145 can then generate an appropriate response, such as, for example, by generating a responsive webpage, which can then be provided to the browser 115, as shown via the communication 131. As before, although it is shown as a single component 145, the local functionality that can be provided by the web server 125 can be implemented by any one or more interoperable components and can comprise multiple independent services and functions.

In one embodiment, the request analyzer 140 can analyze the request 111 with reference to known patterns, alphanumeric strings, or other like information that can be contained in the request 111. For example, the request analyzer 140 can comprise a listing of alphanumeric strings that can be identifiable with the existing functionality 170 of the web server 135. Upon receiving the request 111, the request analyzer 140 can simply traverse through this listing of alphanumeric strings to determine whether the request 111 comprises at least one of them. If the request 111 does not comprise any such alphanumeric strings, then the determination can be made, by the request analyzer 140, to direct the request to the local functionality 145, as illustrated by the communication 124. In the situation where the request 111 may be a malformed request, or an improper request, the local functionality 145 can comprise sufficient capability to generate a response 131, such as, for example, a response indicating that the request 111 was misdirected, malformed, or otherwise improper. Otherwise, the local functionality 145 can respond to the request 111 appropriately.

If, on the other hand, the request analyzer 140 determines that the request 111 comprises at least one known pattern, alphanumeric string, or other like information that can be associated with the existing functionality 170 of the web server 135, then the request analyzer 140 can direct the request to the back-end request generator 150, as illustrated by the communication 126. In one embodiment, the request analyzer 140 can stop its analysis of the request 111 when it identifies a single known pattern, alphanumeric string, or other like information that matches the request 111, and the request analyzer 140 need not iterate through all known patterns, alphanumeric strings, or other like information to identify any others that may also match portions of the request 111.

One common form of the request 111 can be in the form of a resource identifier. In such a case, the request analyzer 140 can analyze the requested resource identifier by iterating through a listing of alphanumeric strings that are known resource identifiers, or portions of resource identifiers, of the existing functionality 170 of the web server 135. As before, if the request analyzer 140 identifies at least one such alphanumeric string in the resource identifier of the request 111, then the request analyzer 140 can determine that the request 111 was directed to the existing functionality 170, and can direct the request to the back-end request generator 150, as illustrated by the communication 126.

In one embodiment, the back-end request generator 150 can generate an appropriate back-end request, such as the request 141, that can comprise appropriate instructions for the web server 135. In generating the back-end request 141, the back-end request generator 150 can utilize some, or all, of the information provided by the request 111, which can be provided to the back-end request generator 150 by the request analyzer 140, as indicated above. For example, if the request 111 referenced a resource identifier, the back-end request generator 150 can reference that same resource identifier. Similarly, as another example, if the request 111 included an indication of the type of browser 115 that was making the request 111, the back-end request generator 150 can include an indication of that same type of browser when forming the back-end request 141. In such a manner, any browser specific aspects of a response that would be generated to existing functionality 170 can be retained. Other aspects of the request 111 can likewise be copied, or mimicked, by the back-end request generator 150 in the back-end request 141.

In generating the back-end request 141, the back-end request generator 150 can, in one embodiment, reference a set of rules, or guidelines, that can instruct the back-end request generator 150 as to which aspects of the request 111 are to be retained in the back-end request 141, and which aspects may need to be modified. Such a set of rules can vary depending on the type of request, which, as indicated previously, can be determined by the request analyzer 140. The request analyzer 140 can then, when transmitting the request 111 to the back-end request generator 150, via the communication 126, likewise transmit an indication of the determined type of the request, which the back-end request generator 150 can then utilize to determine which aspects of the request 111 to utilize in forming the back-end request 141.

One example of the type of modifications that can be made by the back-end request generator 150 to aspects of the request 111, when generating the back-end request 141, can be modifications to the resource identifier specified in the request 111. For example, the browser 115 may have made the request 111 with reference to one or more resource identifiers in a format specific to the web server 125. However, such a resource identifier format may be different than that utilized by the web server 135. Consequently, in forming the back-end request 141, the back-end request generator 150 can translate, or otherwise change, one or more of the resource identifiers specified in the request 111 in order to conform to the resource identifier format expected by the web server 135. As a specific example of one such change, provided within the context of the ubiquitous Uniform Resource Locators (URLs) of the WWW, the web server 125 can expect, and the browser 115 can provide, via the request 111, URLs in the format of:

http://<indentified_server>/agent.jsp?user_name=John_Smith, while the web server 135 can expect URLs in the format of: http://<indentified_server>/code.jsp?firstname=John&lastname=Smith. As can be seen, the URL format expected by the Web server 135 can comprise a different name for the script being referenced, and can utilize a different format for specifying a user's name. Within the context of this specific example, although the request 111 can provide a URL in the first format, the back-end request generator 150 can generate the back-end request 141 in the second format by, for example, changing the name of the script referenced by the URL specified in the request 111, and by separating the user name specified by the URL of the request 111 into a first name and a last name, and associating both with the variables "firstname" and "lastname", as appropriate. As can be seen, in generating the back-end request 141, and, more specifically, in generating the resource identifiers of the back-end request 141, the back-end request generator 150 can reorder or rename various strings, or other pieces, of one or more resource identifiers specified by the browser 115 in the request 111.

Another aspect that can differ between the back-end request 141, that can be generated by the back-end request generator 150, and the request 111, received by the web server 125 from the browser 115, can be the inclusion of additional headers, or other like data that can be provided with the back-end request 141, by the back-end request generator 150. For example, the back-end request 141, generated by the back-end request generator 150, can comprise a header that can identify the request 141 as a back-end request. As another example, the back-end request generator 150 can specify, such as in a header of the back-end request 141, the formatting of a back-end response from the web server 135. Such a specification of the formatting of the back-end response can, for example, be comprised of instructions, to the web server 135, to provide information in one or more headers of the back-end response which would, instead, typically be included in the body of the response. Such information can include, for example, an identification of the styles and scripts utilized by, or associated with, the back-end response. Such information can also include, for example, other metadata associated with the back-end response.

In one embodiment, the back-end request generator 150 can specify, such as in the headers of the back-end request 141, the formatting, or structure, of resource identifiers that can be part of the back-end response. For example, the back-end request generator 150 can provide a resource identifier template, comprising variables to indicate the requested structure, or nomenclature, of resource identifiers that can be part of the back-end response. Returning to the specific example of URLs within the context of WWW, the back-end request generator 150 can include, such as in the headers of the back-end response 141, an instruction that URLs provided as part of a back-end response are to be in the format of: http://<identified_server>/<identified_code>?<variable_name>=<variable_value>, where each of the elements within the angle brackets can be treated as variables by the web server 135, which can then replace those variables with the appropriate information, utilizing the specified format.

Once the back-end request generator 150 generates the back-end request 141, it can transmit it to the web server 135 executing on the server computing device 130. The web server 135, upon receiving a request, such as the back-end request 141, can initially determine whether the received request is a back-end request, such as, for example, by referencing one or more of the headers described above that were provided with the back-end request 141 by the back-end request generator 150. If the web server 135 determines that the request 141 is a back-end request, it can provide it to a back-end request parser 165, as illustrated by the communication 152.

The back-end request parser 165 can be designed to look for and understand the instructions provided by the back-end request generator 150, such as via the headers of the back-end request 141. The back-end request parser 165 can then direct the back-end response generator 175 accordingly. For example, the back-end request parser 165 can instruct the back-end response generator 175 to provide information, which would typically be part of the body of the response, instead in the headers of the response, as requested by the back-end request 141. As another example, the back-end request parser 165 can identify other formatting requested by the back-end request 141, and can instruct the back-end response generator 175 accordingly. Such other formatting can include the above described resource identifier formatting, which the back-end request parser 165 can obtain from the back-end request 141, and can then instruct the back-end response generator to change one or more of the resource identifiers that may be generated by the existing functionality 170, in accordance with the formatting specified in the back-end request 141.

The portions of the back-end request 141 that are relevant to the existing functionality 170 can be provided to existing functionality 170 by the back-end request parser 165, as illustrated by the communication 154. For example, the existing functionality 170 can expect requests in a format similar to that of the back-end request 141, except without the additional information, such as the additional headers, that can have been provided by the back-end request generator 150. The back-end request parser 165 can then remove such information, such as the headers, from the back-end request 141, and provide, to the existing functionality 170, via the communication 154, a request that is in the format expected by the existing functionality 170.

The existing functionality 170 can then provide the network service, or other functionality, that it originally provided. For example, if the existing functionality implemented a mail interface, the existing functionality 170 can respond to the request 154, received from the back-end parser 165, with a response 156 that can be a collection of information regarding, for example, a series of messages in a user's inbox. In one embodiment, the existing functionality 170 can generate a response that can comprise one or more resource identifiers and, indeed, the usefulness of existing functionality 170 that is being retained, and reused, can be this ability to generate a response that comprises the requested information, such as in the form of one or more resource identifiers, or another collection of information that can be understood by the browser 115.

Once the existing functionality 170 has generated a response, the back-end response generator 175 can obtain that response, as illustrated by the communication 156. The back-end response generator 175 can then modify the response from the existing functionality 170 in accordance with any specific requests identified by the back-end parser 165 from the back-end request 141. For example, the back-end response generator 175 can remove information from the body of the response generated by the existing functionality 170 and can, instead, provide such information in one or more headers with the back-end response 161. As indicated previously, such information can include an identification of the styles utilized in the response from the existing functionality 170, scripts utilized by the response from the existing functionality 170, and other metadata associated with the response from the existing functionality 170. Such other metadata can include, for example, search terms generated by the existing functionality 170, that are not intended to be presented to a user, but rather are intended to enable one or more search engines to appropriately index, or otherwise search, one or more pages that are generated by the existing functionality 170.

In each case, in accordance with the rules identified by the back-end request parser 165, the back-end response generator 175 can move such information from the body of the response received from the existing functionality 170, such as via the communication 156, into one or more headers that will be transmitted with the back-end response 161. Returning again to the specific example of the WWW, if the response from the existing functionality 170 utilizes HTML, the back-end response generator 175 can move one or more pieces of information from the HTML HEAD element of the response generated by the existing functionality 170 to one or more headers that will be transmitted with the back-end response 161.

Additionally, the back-end response generator 175 can reformat resource identifiers that are part of the response generated by the existing functionality 170 in accordance with the resource identifier formatting provided by the back-end request parser 165, which was specified by the back-end request generator 150 in the back-end request 141, in the manner indicated previously. Thus, the back-end response generator 175 can, for example, reorder various strings in the resource identifiers generated by the existing functionality 170 in order to conform to the resource identifier formatting provided by the back-end request parser 165.

In one embodiment, to avoid conflicts between, for example, the styles specified with the response generated by the existing functionality 170, and styles that may utilize the same name to reference different presentation within the context of the web server 125, the back-end response generator 175 can rename all of the styles specified by the response generated by the existing functionality 170 in accordance with predefined rules, such as, for example, by appending a prefix or suffix to each identified style, thereby differentiating the identified style from another style within the context of the web server 125 that may have had the same name. To further avoid conflict between styles, the web server 125 can, in one embodiment, reset all style defaults before applying any new styles in the response it provides to the browser 115. Additionally, the web server 125 can, itself, utilize specific and unique style naming nomenclature, to avoid conflicts with styles utilized by the existing functionality 170.

As can be seen from the system 100 of FIG. 1, once the back-end response generator has generated the back-end response 161, and the associated headers, it can transmit the back-end response 161 to the web server 125, where it can be received by a back-end response parser 155. Initially, the back-end response parser 155 can first determine whether the back-end response 161 comprises content that is of a processable type. For example, within the specific context of the WWW, if the back-end response 161 is not within an HTML format, such as, for example, if the back-end response 161 is an image, then the back-end response 161 may not comprise any information that can be processed further by the Web server 125. In such an example, the back-end response parser 155 can determine that the back-end response 161 is not of a processable type. Consequently, the back-end response parser 155 can instruct the response generator 160, such as via the communication 172, to simply provide the back-end response 161 to the browser 115, as the response 181, without modification. Thus, for example, if the back-end response 161 is an image, the back-end response parser 155 could simply instruct the response generator 160 to provide that same image to browser 115, as the response 181.

If, on the other hand, the back-end response parser 155 determines that the back-end response 161 is of a processable type, the back-end response parser 155 can subsequently determine whether the back-end response 161 comprises an error. As will be recognized by those skilled in the art, various standardized error codes can be utilized, with each web server then having the opportunity to further expound on such error codes, or otherwise personalize the error messages. Thus, if the back-end response 161 comprises an error, the back-end response parser 155 can, such as via the communication 172, instruct the response generator 160 to generate an equivalent error as part of the response 181 that is provided to the browser 115. Thus, if the web server 125 utilizes a notification or description for various errors that differs from that utilized by the web server 135, the response 181 to the browser 115, regarding the error that was originally generated by the existing functionality 170, can be in accordance with the description utilized by the web server 125, and not the web server 135.

If the back-end response parser 155 determines that the back-end response 161 is both of the processable type, and does not comprise an error indicator, or code, the back-end response parser 155 can proceed to instruct the response generator 160, such as via the communications 172, to generate the response 181 to the browser 115. For example, in accordance with the above descriptions, the back-end response parser 155 can obtain the information that was specified in one or more headers of the back-end response 161 and can instruct the response generator 160 to incorporate such information into the body of the response 181. Returning again to the specific example of HTML within the context of the WWW, information from the headers of the back-end response 161 can be incorporated into the HTML HEAD element of the response 181 generated by the response generator 160, in accordance with the instructions provided by the back-end response parser 155. As another example, the content generated by the existing functionality 170 that can have been contained within the body of the back-end response 161 can be copied by the back-end response parser 155 into the body of the response 181 being generated by the response generator 160. As will be recognized by those skilled in the art, such content can be the very reason for the mechanisms described herein and, as such, the mechanisms described herein essentially represent edge components that provide processing and functionality "around" this central content.

Once the response generator 160 has generated the response 181 in accordance with the instructions received from the back-end response parser 155 via the communication 172, the response generator 160 can transmit the generated response 181 to the browser 115, thereby providing the browser 115 with access to the existing functionality 170 through a new interface provided by the web server 125. In one embodiment, to improve performance, the web server 125 can cache one or more of the back-end responses 161, or the generated responses 181, such that multiple requests, such as the request 111, directed to the same information that are received approximately to one another can be responded to without referencing the web server 135, thereby gaining efficiency. Additionally, as will be recognized by those skilled in the art, the components of the web servers 125 and 135 illustrated in the system 100 of FIG. 1 define arbitrary divisions and are only provided to conceptually illustrate the mechanisms described, and not to indicate specific delineations of computer executable instructions as belonging to one component or another. Indeed, as will be well known to those skilled in the art, the above described mechanisms can be implemented in any one or more components that can be delineated based on a number of factors, including, for example, based on functionality, existing development, and other like programming considerations, and the components illustrated in FIG. 1 are not meant to define a specific, necessary, division of the above described functionality.

Figure 2:
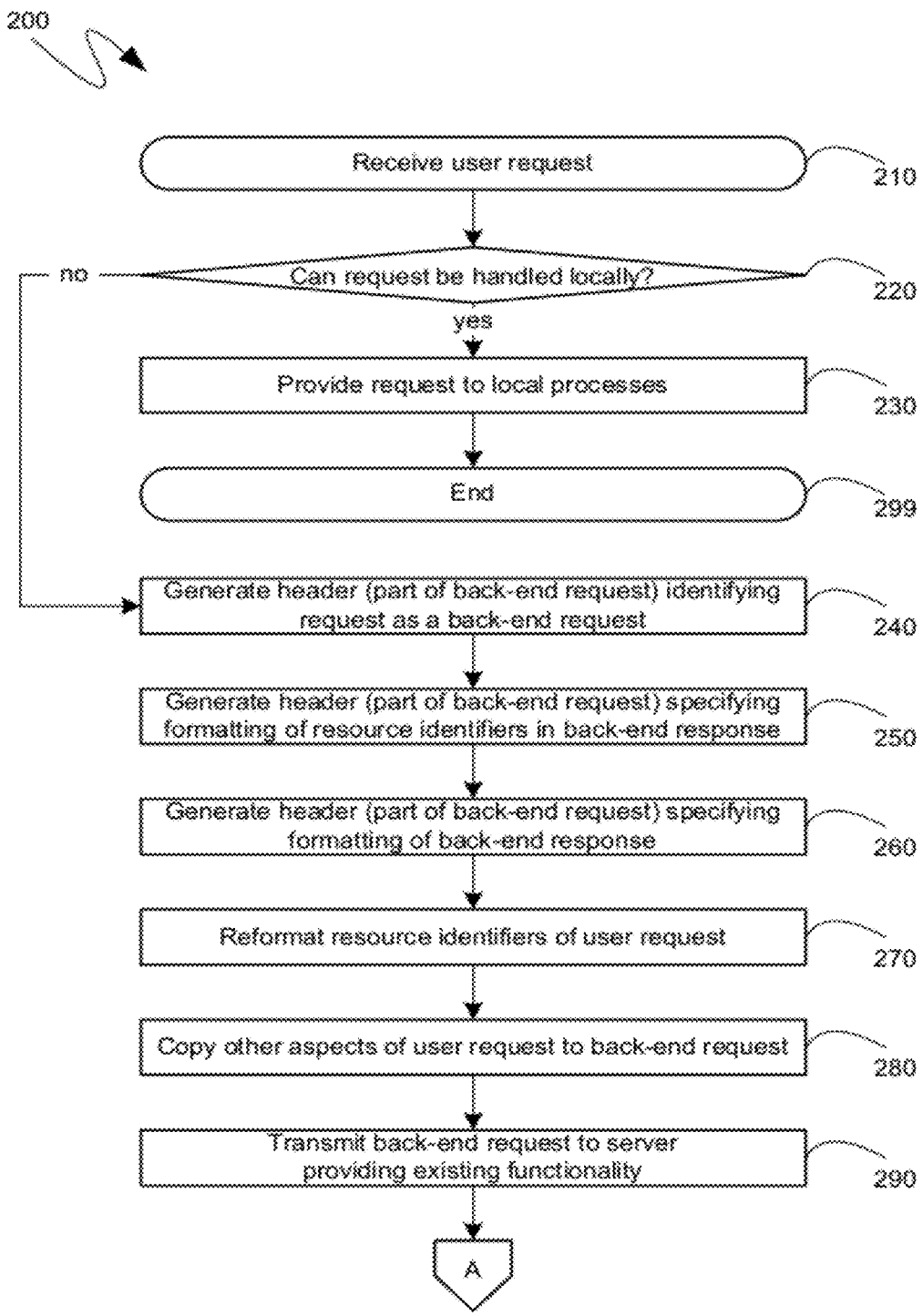
FIG. 2 is a flow diagram of an exemplary operation of a new network service.

Turning to FIG. 2, the flow diagram 200 shown therein illustrates an exemplary series of steps that can be performed by a server providing a new interface to existing functionality, such as the web server 125 illustrated in the system 100 of FIG. 1 and described in detail above. Initially, as can be seen, at step 210, a user request can be received. Subsequently, at step 220, a determination can be made as to whether the request received at step 210 can be handled locally, or otherwise without reference to existing functionality implemented by a different server. As described in detail above, the determination, at step 220, can, in one embodiment, be performed with reference to a list of strings, or other alphanumeric characters, that can identify, or enable the categorization of, the request that was received at step 210. If, at step 220, it is determined that the request can be handled locally, then the request can be provided to locally executing processes at step 230. Since such locally executing processes can respond to the request received at step 210 in a known manner, the relevant processing can end at step 299.

However, if, at step 220, it is determined that the request cannot be handled locally and is, instead, a request to existing functionality implemented by a different server, processing can proceed with step 240 at which point the generation of the back-end request can be performed, at least in part, with the generation of a header that can identify the request as a back-end request. Similarly, at step 250, a header of the back-end request can be generated specifying the formatting of, for example, resource identifiers that can be part of a back-end response, such as in the manner described in detail above. Likewise, at step 260, a header of the back-end request can be generated that can specify other formatting of the back-end response, such as, for example, that certain elements or information that can typically be provided as part of the body of the response are to be, instead, provided via headers of the back-end response.

At step 270, if appropriate, one or more resource identifiers of the request that was received at step 210 can be reformatted in accordance with a different resource identifier formatting scheme that can be utilized by the server providing the existing functionality. At step 280, other aspects of the user's request, that was received at step 210, can be copied to the back-end request. In one embodiment, the determination, at step 220, can categorize the request that was received at step 210, such as based on the alphanumeric characters, or strings, found in the request that was received at step 210, and such categorization can be the basis for one or more rules that can define which aspects of the user's request are copied to the back-end request at step 280, and which aspects can be modified, such as in the case of the resource identifiers that can be modified at step 270. Once the back-end request can have been generated, it can be transmitted, at step 290, to the server providing the existing functionality. The relevant processing can then proceed with the steps shown in the flow diagram 300 of FIG. 3.

Figure 3:
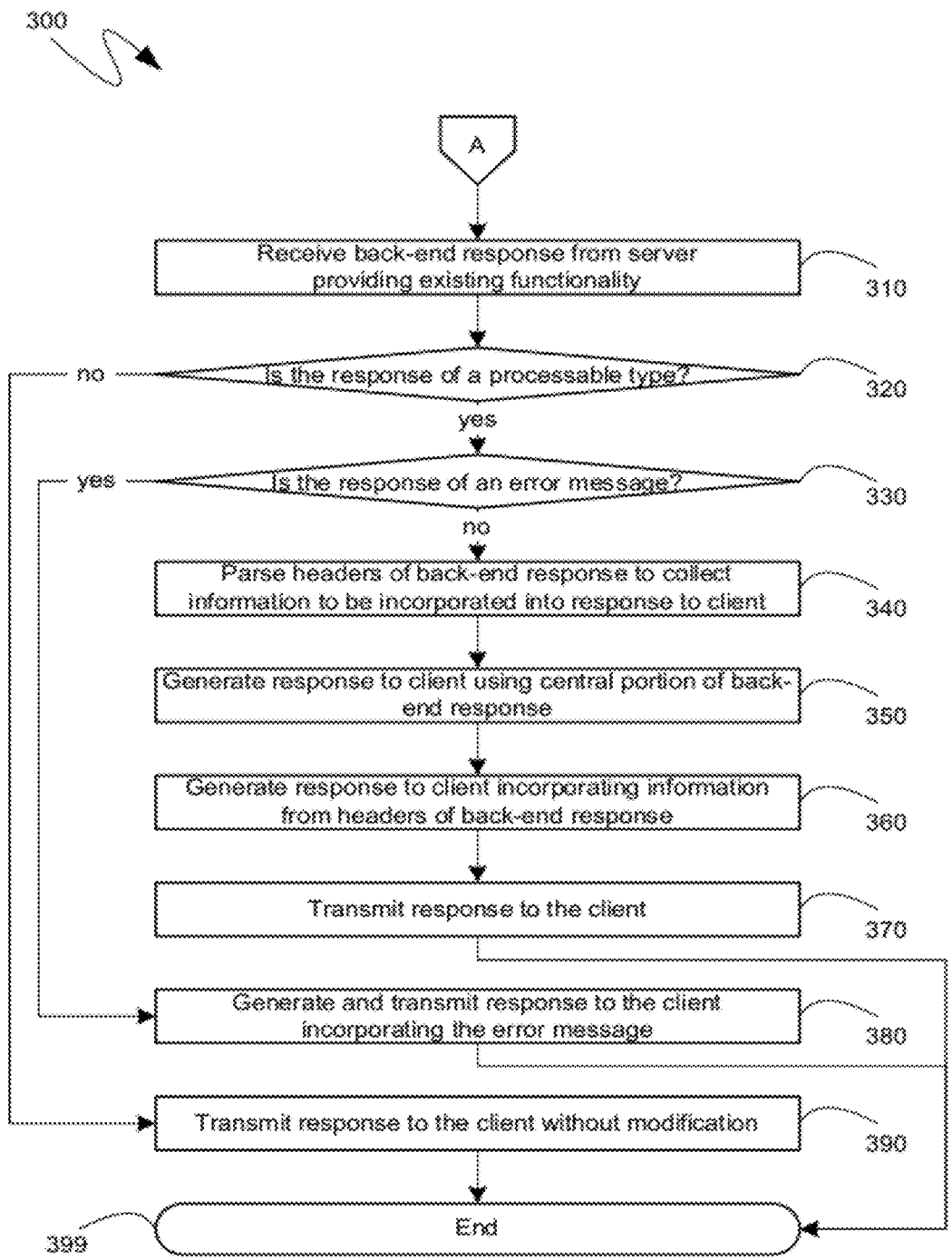
FIG. 3 is a flow diagram of another exemplary operation of a new network service.

Turning to FIG. 3, the flow diagram 300 shown therein illustrates a further exemplary series of steps that can be performed by a server providing a new interface to existing functionality, such as the web server 125 illustrated in the system 100 of FIG. 1 and described in detail above. As can be seen, at step 310, a back-end response can be received to the back-end request that was generated in accordance with the flow diagram 200 of FIG. 2 and transmitted at step 290, also shown in FIG. 2. Initially, at step 320, a determination can be made as to whether the back-end response is of a processable type. In a specific WWW-centric example, the determination, at step 320, can comprise a determination of whether the back-end response comprises HTML or some other data that cannot be parsed and modified, such as, for example, image data. If, at step 320, it is determined that the response is not the processable type, processing can proceed with step 390 at which point the back-end response that was received at step 310 can be transmitted to the client without modification. The relevant processing can then end at step 399.

However, if, at step 320, it is determined that the back-end response received at step 310 is of the processable type, then processing can proceed with further determination, at step 330, whereby the back-end response can be analyzed to determine whether it comprises an error message, or an error code. If, at step 330, it is determined that the back-end response, received at step 310, comprises an error, processing can proceed with step 380 whereby an error message can be generated in accordance with the error information from the back-end response received at step 310, and can be transmitted to the client. The relevant processing can then end at step 399.

If, at step 330, it is determined that the response, received at step 310, does not comprise an error, then processing can proceed to step 340 at which point one or more headers of the back-end response can be parsed to collect information that can then be incorporated, at step 360, into the body of the response being generated for the client. For example, as indicated previously, such information can include metadata, such as search terms that can be utilized by one or more search engines. As another example, as has also been indicated previously, such information can include an identification of the styles utilized in the back-end response, and an identification of the scripts utilized in the back-end response. At step 350, the central portion of the back-end response, namely that portion of the back-end response that was provided by the existing services that are being reused, can be copied to the response being generated for the client. At step 360, the information obtained from the headers at step 340 can also be incorporated into the body of the response being generated for the client, in accordance with known, and typically standardized, protocols. At step 370, the response, comprising the information received from the existing services, and formatted with the new interface, can be transmitted to the client. The relevant processing can then end at step 399.

Figure 4:
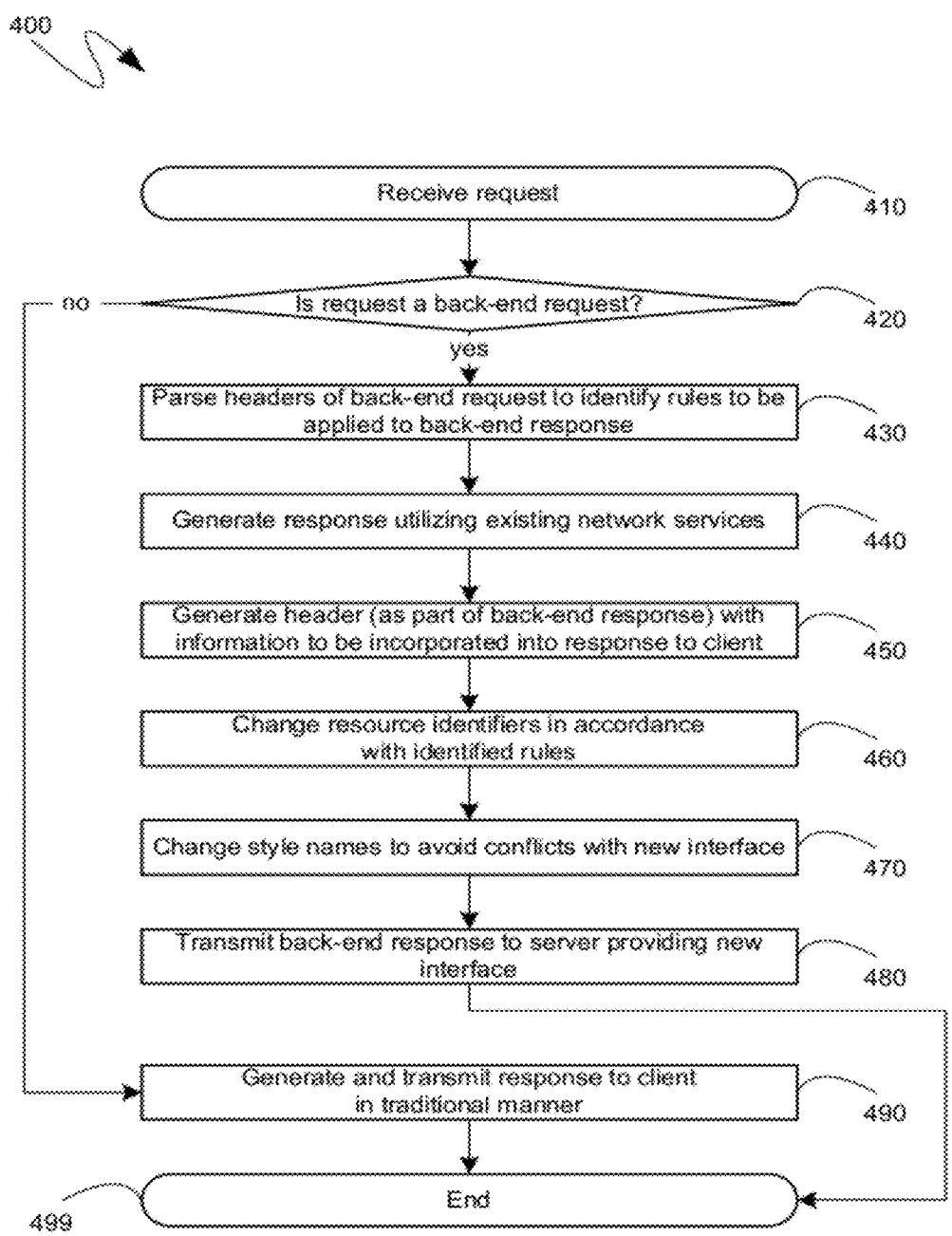
FIG. 4 is a flow diagram of an exemplary operation of an existing network service.

Turning to FIG. 4, the flow diagram 400 shown therein illustrates an exemplary series of steps that can be performed by a server hosting the existing network services that are being reused. Initially, at step 410, such a server can receive a request. At step 420, a determination can be made as to whether the request has been formatted in accordance with that described above and is identified as a back-end request. If, at step 420, the request that was received at step 410 is found not to be a back-end request, processing can proceed with step 490, in which case the response can be generated and transmitted to a client in a traditional manner. The relevant processing can then end at step 499.

However, if, at step 420, it is determined that the request, that was received at step 410, is a back-end request, then processing can proceed with step 430, at which point the headers of the request that was received at step 410 can be parsed to identify rules to be applied to any back-end response that may be generated. For example, as indicated previously, such rules can comprise an indication of the formatting of resource identifiers, and can comprise a request that certain information, which is typically provided in the body of the response, instead be provided in one or more headers. Subsequently, at step 440, the existing network services, or other functionality, can be utilized to generate a response to the core request that is part of the back-end request received at step 410. At step 450, information from the response generated in step 440 can be moved to one or more headers, such as in accordance with the rules identified at step 430. Similarly, at step 460, resource identifiers generated, at step 440, as part of the response can be changed, or re-ordered, in accordance with the rules regarding such resource identifiers that were obtained at step 430. At step 470, to avoid conflicts, specific, commonly used, identifiers, such as, for example, commonly used style names, can be changed, such as by pre-pending, or appending, one or more characters to render such style names unique. Subsequently, at step 480, the generated back-end response can be transmitted, and relevant processing can then end at step 499.

Figure 5:
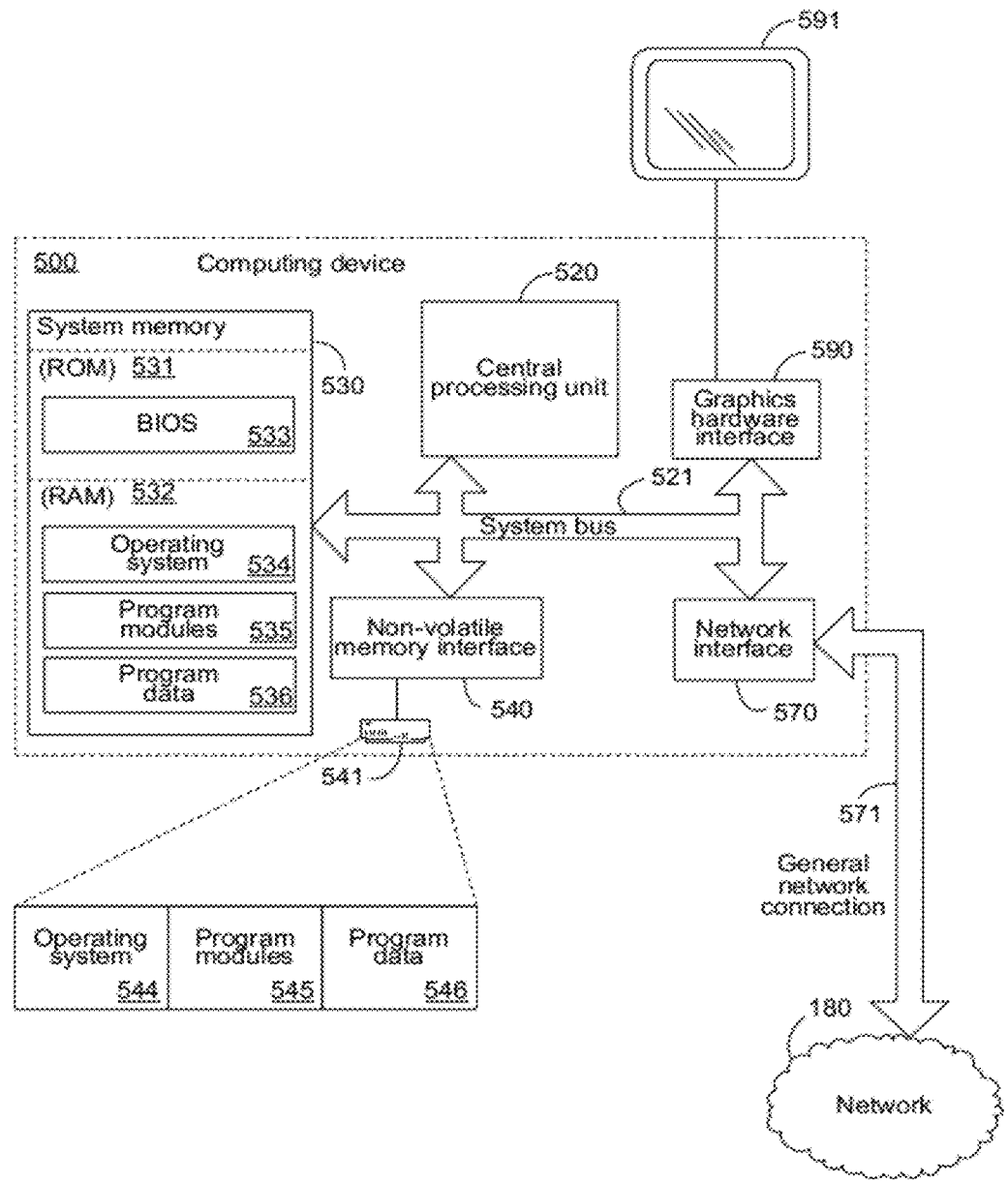
FIG. 5 is a block diagram of an exemplary computing device.

Turning to FIG. 5, an exemplary computing device 500 is illustrated. The exemplary computing device 500 can be any one or more of the client computing device 110 and the server computing devices 120 and 130 illustrated in the previously referenced Figures, whose operations were described in detail above. Similarly, the exemplary computing device 500 can be a computing device that can be executing one or more processes that can represent the client computing device 110 and the server computing devices 120 and 130 illustrated in the previously referenced Figures, such as, for example, by executing one or more processes that create virtual computing environments that can provide for the operations detailed above in connection with the client computing device 110 and the server computing devices 120 and 130. The exemplary computing device 500 of FIG. 5 can include, but is not limited to, one or more central processing units (CPUs) 520, a system memory 530, that can include RAM 532, and a system bus 521 that couples various system components including the system memory to the processing unit 520. The system bus 521 may be any of several types of bus structures including a memory bus or memory controller, a peripheral bus, and a local bus using any of a variety of bus architectures. The computing device 500 can optionally include graphics hardware, such as for the display of visual user interfaces, including, but not limited to, a graphics hardware interface 590 and a display device 591. Depending on the specific physical implementation, one or more of the CPUs 520, the system memory 530 and other components of the computing device 500 can be physically co-located, such as on a single chip. In such a case, some or all of the system bus 521 can be nothing more than silicon pathways within a single chip structure and its illustration in FIG. 5 can be nothing more than notational convenience for the purpose of illustration.

The computing device 500 also typically includes computer readable media, which can include any available media that can be accessed by computing device 500 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and the aforementioned RAM 532. A basic input/output system 533 (BIOS), containing the basic routines that help to transfer information between elements within computing device 500, such as during start-up, is typically stored in ROM 531. RAM 532 typically contains data and/or program modules that are immediately accessible to and/or presently being operated on by processing unit 520. By way of example, and not limitation, FIG. 5 illustrates the operating system 534 along with other program modules 535, and program data 536.

The computing device 500 may also include other removable/non-removable, volatile/nonvolatile computer storage media. By way of example only, FIG. 5 illustrates the hard disk drive 541 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers hereto illustrate that, at a minimum, they are different copies.

The computing device 500 can operate in a networked environment using logical connections to one or more remote computers. The computing device 500 is illustrated as being connected to the general network connection 571 through a network interface or adapter 570 which is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 571. It will be appreciated that the network connections shown are exemplary and other means of establishing a communications link between computing devices may be used.

As can be seen from the above descriptions, mechanisms for reusing existing network services while providing a new interface have been enumerated. In view of the many possible variations of the subject matter described herein, we claim as our invention all such embodiments as may come within the scope of the following claims and equivalents thereto.

We claim:

1. One or more computer-readable memory comprising computer-executable instructions for reusing existing network-based services provided by a server, the computer-executable instructions directed to perform steps comprising:
  receiving a client request from a client, the client request having a first Uniform Resource Locator (URL) formatting for specifying resource identifiers;
  enquiry
  determining whether the client request is directed to the existing network-based services; and
  generating, if the client request is directed to the existing network-based services, a back-end request to the server providing the existing network-based services, the generated back-end request having a second URL formatting, differing from the first URL formatting, for specifying the resource identifiers, the generated back-end request comprising: at least a portion of the client request, an indication that the request is a back-end request, and back-end response formatting instructions specifying a formatting for a back-end response to the back-end request.

2. The computer-readable memory of claim 1, wherein the determining comprises comparing the client request to the first and the second URL formattings.

3. The computer-readable memory of claim 1, wherein the indication that the request is the back-end request and the back-end response formatting instructions are provided in one or more headers of the back-end request.

4. The computer-readable memory of claim 1, wherein the back-end response formatting instructions comprise a template describing how resource identifiers generated by the server are to be reformatted when being provided as part of the back- end response from the server.

5. The computer-readable memory of claim 1, wherein the back-end response formatting instructions comprise instructions to return specified information in a header of the back-end response as opposed to within the back-end response itself.

6. The computer-readable memory of claim 1, wherein the at least a portion of the client request comprises one or more headers of the client request, selected in accordance with header-specific rules.

7. The computer-readable memory of claim 1, comprising further computer-executable instructions for: receiving the back-end response from the server in response to the back-end request;
  determining whether the back-end response is of a processable type; transmitting the back-end response unmodified to the client in response to the client request if the back-end response is not of a processable type; and generating, if the back-end response is of a processable type, a client response to the client request, the client response comprising: at least a portion of the back-end response that was generated by the existing network-based services and, information obtained from one or more headers of the back-end response.

8. The computer-readable memory storage media of claim 7, comprising further computer-executable instructions for: determining, prior to the generating the back-end response, if the back-end response is of a processable type, whether the back-end response comprises an error; and generating an error client response to the client request in accordance with the error of the back-end response, if the back-end response comprises the error; wherein the computer-executable instructions for generating the client response are only executed if the back-end response does not comprise an error.

9. The computer-readable memory of claim 7, wherein the information obtained from one or more headers of the back-end response comprises an identification of styles associated with the portion of the back-end response that was generated by the existing network-based services.

10. The computer-readable memory of claim 7, wherein the information obtained from one or more headers of the back-end response comprises an identification of scripts associated with the portion of the back-end response that was generated by the existing network-based services.

11. One or more computer-readable memory comprising computer-executable instructions for enabling the reuse of existing network-based services by a new server, the computer-executable instructions directed to perform steps comprising:
  receiving a request, formed as a URL, the received request comprising instructions specifying a formatting for a back-end response to the request;
  determining whether the request is a back-end request; and
  generating, if the received request is the back-end request, the back-end response to the new server, the generated back-end response having the formatting specified in the received request, the generated back-end response comprising: content generated by the existing network-based services and headers comprising back-end response header information in accordance with the formatting specified in the received request.

12. The computer-readable memory of claim 11, wherein the back-end response header information comprises an identification of styles associated with the content generated by the existing network-based services.

13. The computer-readable memory of claim 11, wherein the back-end response header information comprises an identification of scripts associated with the content generated by the existing network-based services.

14. The computer-readable memory of claim 11, wherein the back-end response header information comprises keywords for one or more search engines.

15. A system for reusing existing network-based services, the system comprising:
  a first computing device executing a first server providing access to the existing network-based services through a new interface, the first server performing steps comprising:
    receiving a client request having a first URL formatting for specifying resource identifiers;
    determining whether the client request is directed to the existing network-based services;
    generating, if the client request is directed to the existing network-based services, a back-end request, the generated back-end request having a second URL formatting, differing from the first URL formatting, for specifying the resource identifiers, the generated back-end request comprising: at least a portion of the client request, an indication that the request is a back-end request, and back-end response formatting instructions specifying a formatting for a back-end response to the back-end request; and
    transmitting the generated back-end request to a second server; and
  a second computing device executing the second server providing the existing network-based services, the second server performing steps comprising:
    receiving the back-end request;

generating, the back-end response, the generated back-end response having the formatting specified in the back-end request, the generated back-end response comprising:
content generated by the existing network-based services and headers comprising back-end response header information in accordance with the formatting specified in the back-end request; and
transmitting the back-end response to the first server.

16. The system of claim 15, further comprising a third server providing the existing network-based services, wherein the second server and the third server are both instances of a same set of computer-executable instructions providing the existing network-based services; and wherein further the determining whether the request is the back-end request, the generating the back-end response and the transmitting the back-end response are performed by edge components present in the second server, but not the third server.

17. The system of claim 15, wherein the first server performs further steps comprising: receiving the back-end response; determining whether the back-end response is of a processable type; transmitting the back-end response unmodified to the client in response to the client request if the back-end response is not of a processable type; and generating, if the back-end response is of a processable type, a client response to the client request, the client response comprising: at least a portion of the back-end response that was generated by the existing network-based services and, information obtained from one or more headers of the back-end response.

18. The system of claim 15, wherein the first computing device and the second computing device are a single computing device and the first server and the second server are co-located on the single computing device.

19. The system of claim 15, wherein the indication that the request is the back-end request and the back-end response formatting instructions are provided in one or more headers of the back-end request generated by the first server.

20. The system of claim 15, wherein the back-end response header information of the back-end response generated by the second server comprises an identification of scripts associated with the content generated by the existing network-based services.

\* \* \* \* \*